United States Patent [19]
Moore

[11] 3,775,868
[45] Dec. 4, 1973

[54] FORM BOARD FOR CHILD EDUCATION

[76] Inventor: H. Daniel Moore, 701 Orange Grove, Apt. 106, South Pasadena, Calif. 91030

[22] Filed: Feb. 12, 1973

[21] Appl. No.: 331,807

Related U.S. Application Data

[63] Continuation-in-part of Ser. No. 86,252, Nov. 2, 1970, abandoned.

[52] U.S. Cl. .................................. 35/22 A, 35/31 D
[51] Int. Cl. .......................................... G09b 19/00
[58] Field of Search.................... 35/22 A, 30, 34, 35/70, 72, 73; 25/1; 46/16

[56] References Cited
UNITED STATES PATENTS

| | | | |
|---|---|---|---|
| 1,068,449 | 7/1913 | Reeder | 35/22 A UX |
| 1,257,655 | 2/1918 | Walden | 35/73 X |
| 2,252,678 | 8/1941 | Beary | 35/72 UX |
| 2,377,100 | 5/1945 | Patterson | 35/22 A |
| 2,611,193 | 9/1952 | Davis | 35/72 X |
| 3,166,860 | 1/1965 | Delaney | 35/72 X |
| 3,191,937 | 6/1965 | Kropinski | 35/72 X |
| 3,496,652 | 2/1970 | Wolfner | 35/22 A |

OTHER PUBLICATIONS

Milton Bradley Educational Materials Catalog for 1965–1966 received May, 1966, page 20.
Childcraft Education Corp., Toys that Teach, Catalog received Oct. 17, 1970, page 7 only.
C. H. Stoelting Co., Catalog received Aug. 1930, pp. 58, 59.

*Primary Examiner*—Harland S. Skogquist
*Attorney*—Robert L. Parker et al.

[57] ABSTRACT

A flat base has a first plurality of flat depressions, a second plurality of flat depressions, and a third plurality of flat depressions arranged in adjacent rows so the depressions form columns perpendicular to the rows. The first plurality of depressions have identical circular shapes; the second plurality of depressions have identical triangular shapes; and the third plurality of depressions have identical square shapes. A first set of geometric form blocks equal in number to the first plurality of depressions each have bases shaped to fit interchangeably into the first plurality of depressions. A second set of form blocks equal in number to the second plurality of depressions each have bases shaped to fit interchangeably into the second plurality of depressions. A third set of form blocks equal in number to the third plurality of depressions each have bases shaped to fit interchangeably into the third plurality of depressions. Each block of the first set has a characteristic in common with a block of the second set and a block of the third set. Some of these characteristics are height, profile, color, and fractionalization. The form blocks are hollow and open on one side.

23 Claims, 4 Drawing Figures

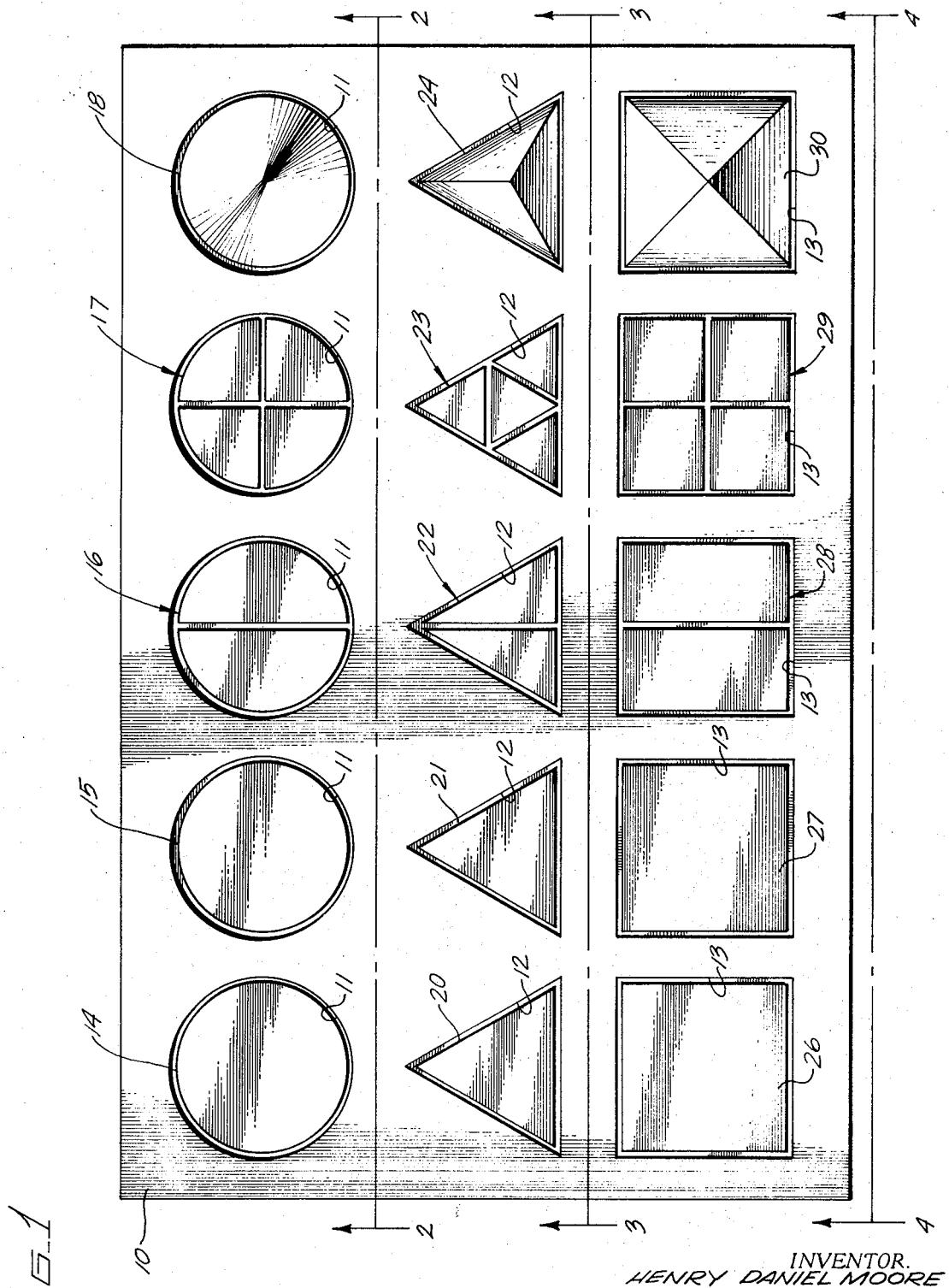

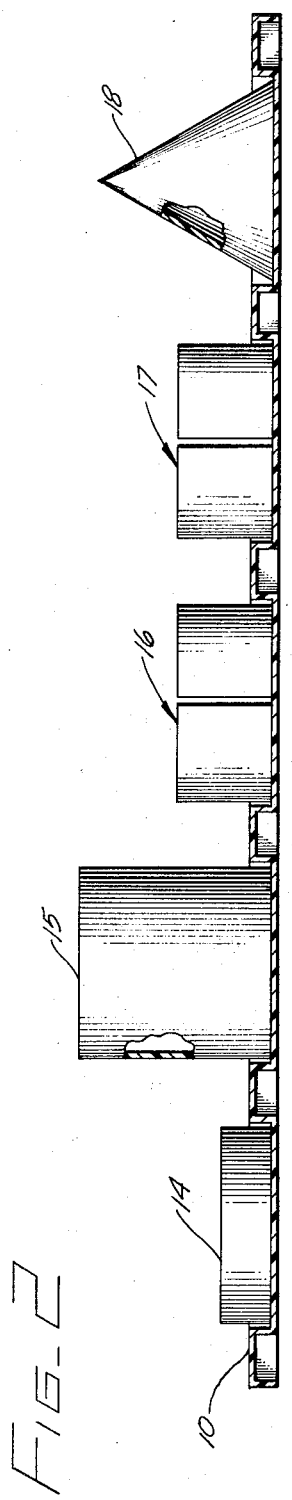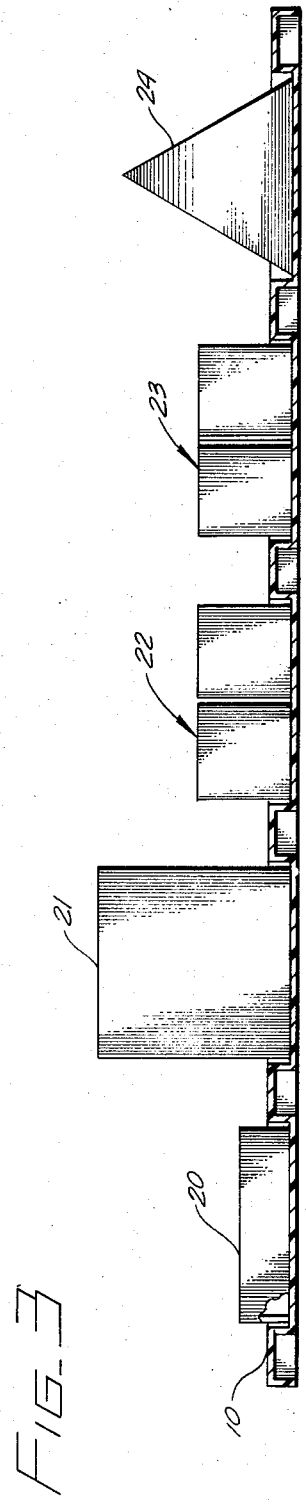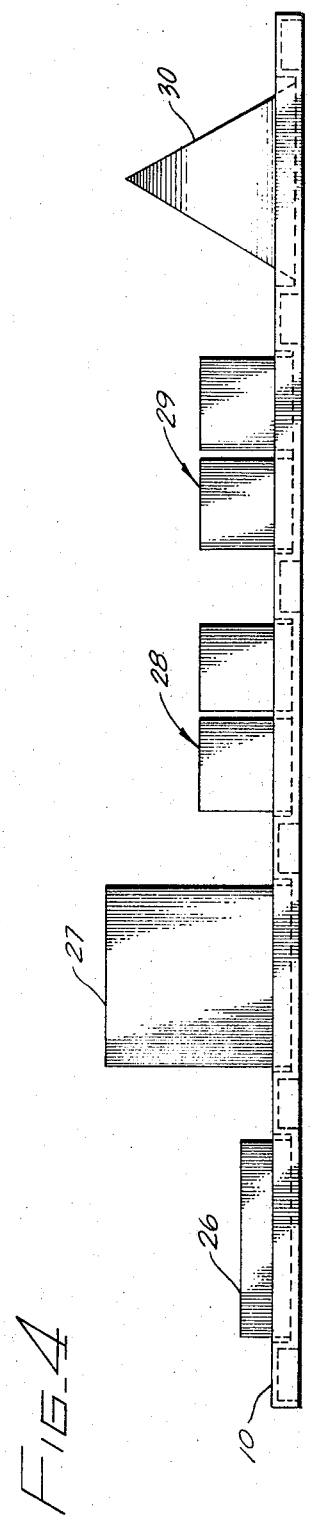

FORM BOARD FOR CHILD EDUCATION

CROSS-REFERENCE TO RELATED APPLICATIONS

This application is a continuation-in-part of application Ser. No. 86,252, filed Nov. 2, 1970, and now abandoned.

BACKGROUND OF THE INVENTION

This invention relates to child education and, more particularly, to a form board that can be used to teach children many different spatial and visual relationships.

In recent years, it has become recognized that the most formative period of human intellectual development is early childhood. For this reason, educators and parents have begun to lay special emphasis on preschool child education. An important part of a child's early intellectual development is learning spatial and visual relationships, similarities, and differences. For example, it is important for a child to understand the relationships tall and short, inside and outside, corner and side, and flat and pointed. It is also important for a child to learn to recognize the similarities and differences of shapes of plain geometric outlines such as circles, triangles, and squares, and three dimensional forms such as cubes, prisms, cylinders, cones, and pyramids. In learning about different geometric outlines and forms, the division of such forms into fractional parts can improve the child's ability to visualize the relationship between the fractions and the whole. Another concept that children should learn early is color recognition, particularly the primary colors.

SUMMARY OF THE INVENTION

The invention concerns a form board that can be used as an effective tool to teach young children many different spatial and visual relationships, similarities, and differences. This form board permits a child to see and touch a number of different geometric outlines and forms at the same time, thereby enabling the child to perceive the relationship between the characteristics of these outlines and forms. Specifically, the form board comprises a flat base and a number of form blocks. The base has a plurality of rows of depressions, which are preferably of geometric shape. The depressions of each row are identical in size and shape to each other and different in shape from the depressions of the other rows. Sets of form blocks, preferably also being of geometric shape, are provided for the respective rows of depressions. Preferably, the form blocks of each set are equal in number to the depressions in one row and have different three dimensional geometric shapes with bases shaped to fit interchangeably into the depressions of that row.

A feature of the invention is the selection of form blocks for one set that have characteristics in common with the form blocks of each of the other sets. Exemplary common characteristics are height, profile, fractionalization, and color.

In the preferred embodiment, the individual depressions of each row are aligned in columns perpendicular to the rows. In one row, the depressions are circular, in another row the depressions are triangular, and in a third row the depressions are square. The form blocks are geometric figures such as cylinders, prisms, cubes, hexahedrons, cones and pyramids. The blocks are hollow and open on one side.

BRIEF DESCRIPTION OF THE DRAWINGS

The features of a specific embodiment of the best mode contemplated of carrying out the invention are illustrated in the drawings, in which:

FIG. 1 is a top plan view of a form board constructed in accordance with the invention;

FIG. 2 is a sectional side elevation view of the form board of FIG. 1 depicting one set of form blocks;

FIG. 3 is a sectional side elevation view of the form board of FIG. 1 depicting another set of form blocks; and FIG. 4 is a side elevation view of the form board of FIG. 1 depicting a third set of form blocks.

DETAILED DESCRIPTION OF THE SPECIFIC EMBODIMENT

In the drawings, a flat base 10 has a plurality of depressions 11, a plurality of depressions 12, and a plurality of depression 13 arranged in adjacent rows. As best illustrated by FIG. 1, depressions 11, 12, and 13 are aligned with each other to form columns that are perpendicular to the rows. Depressions 11 have identical circular shapes; depressions 12 have identical equilaterally triangular shapes; and depressions 13 have identical square shapes.

A set of form blocks 14, 15, 16, 17, and 18 all have geometric shapes with identical circular bases that are shaped to fit interchangeably into any of depressions 11, as illustrated by FIG. 2. Form block 14 is a short cylinder, form block 15 is a tall cylinder, form block 16 is a fractionalized cylinder of medium height, form block 17 is a fractionalized cylinder of medium height, and form block 18 is a cone. Form block 16 comprises two identical cylindrical halves, and form block 17 comprises four identical cylindrical quarters.

A set of form blocks 20, 21, 22, 23, and 24 all have geometric shapes with identical equilaterally triangular bases that are shaped to fit interchangeably into any of depressions 12, as illustrated by FIG. 3. Form block 20 is a short prism, form block 21 is a tall prism, form block 22 is a fractionalized prism of medium height, form block 23 is a fractionalized prism of medium height, and form block 24 is a triangular based pyramid. Form block 22 comprises two mirror image triangular halves, and form block 23 comprises four identical triangular quarters. It should be noted that the four quarters comprising the whole of form block 23 are each equilateral prisms.

DETAILED DESCRIPTION OF THE SPECIFIC EMBODIMENT

In the drawings, a flat base 10 has a plurality of depressions 11, a plurality of depressions 12, and a plurality of depressions 13 arranged in adjacent rows. As best illustrated by FIG. 1, depressions 11, 12, and 13 are aligned with each other to form columns that are perpendicular to the rows. Depressions 11 have identical circular shapes; depressions 12 have identical equilaterally triangular shapes; and depressions 13 have identical square shapes.

A set of form blocks 14, 15, 16, 17, and 18 all have identical circular bases that are shaped to fit interchangeably into any of depressions 11, as illustrated by FIG. 2. Form block 14 is a short cylinder, form block 15 is a tall cylinder, form block 16 is a fractionalized cylinder of medium height, form block 17 is a fractionalized cylinder of medium height, and form block 18 is a cone. Form block 16 comprises two identical cylindrical halves, and form block 17 comprises four identical cylindrical quarters.

A set of form blocks 20, 21, 22, 23, and 24 all have identical equilaterally triangular bases that are shaped to fit interchangeably into any of depressions 12, as illustrated by FIG. 3. Form block 20 is a short prism, form block 21 is a tall prism, form block 22 is a fractionalized prism of medium height, form block 23 is a fractionalized prism of medium height, and form block 24 is a triangular based pyramid. Form block 22 comprises two mirror image triangular halves, and form block 23 comprises four identical triangular quarters. It should be noted that the four quarters comprising the whole of form block 23 are each equilateral prisms.

A set of form blocks 26, 27, 28, 29, and 30 all have geometric shapes with identical square bases that are shaped to fit interchangeably into any of depressions 13, as illustrated by FIG. 4. Form block 26 is a short hexahedron, form block 27 is a tall cubical hexahedron, form block 28 is a fractionalized hexahedron of medium height, form block 29 is a fractionalized hexahedron of medium height, and form block 30 is a square based pyramid. For block 28 comprises two identical hexahedral halves, and form block 29 comprises four identical hexahedral quarters. It should be noted that the four quarters comprising the whole of form block 29 are each cubes.

The form blocks resting in the depressions of each column in the drawings have four characteristics in common, namely, height, fractionalization, profile, and color. For example, form blocks 14, 20, and 26 are all the same color, e.g., red, all the same short height, all the same elongated rectangular profile (compare FIGS. 2, 3, and 4), and all unitary blocks. Form blocks 15, 21, and 27 are all the same color, e.g., blue, all the same tall height, all the same square profile, and all unitary blocks. Form blocks 16, 22, and 28 are all the same color, e.g., yellow, all the same intermediate height, all the same elongated rectangular profile, and all divided into a two-part fractional block. Form blocks 17, 23, and 29 are all the same color, e.g., red, all the same intermediate height, all the same elongated rectangular profile, and all divided into a four-part fractional block. Form blocks 18, 24, and 30 are all the same color, e.g., blue, all the same tall height, all the same equilateral triangular profile, and all unitary blocks.

The term form block is used in this specification to denote a three-dimensional figure, preferably but not necessarily of geometric shape. As depicted in the drawings, the form blocks are all hollow and open on one side. Preferably, the form blocks and the base are manufactured from a suitable plastic by injection molding techniques.

The described form board can be used in many ways to teach young children spatial and visual relationships, differences, and similarities. For detailed step-by-step instructions of one teaching plan utilizing the disclosed form board, reference is made to the book, "Basic Skills," which is part of an educational package entitled, "The Early Explorations Basic Skills Program." Information concerning retail outlets where the package may be obtained is available upon written request to "Early Explorations," care of the Times Mirror Company, Times Mirror Square, Los Angeles, Calif. 90053.

Generally, the form blocks would be introduced to the child in groups of three, beginning with the group shown in the first column on the left of FIG. 1. This acquaints the child with the primary color red, the basic characteristics of a circle, a triangle, and a square, and the concept of corners and sides, as exemplified by the square and the triangle. The column of form blocks second from the left in FIG. 1 is introduced next. This acquaints the child with the primary color blue and the concept of tall and short by comparison with the first column of form blocks. The column of form blocks third from the left in FIG. 1 is introduced next. This acquaints the child with the primary color yellow, fractional halves as related to the whole, and the concept of tall and short by comparison with the first and second columns. The column of form blocks second from the right is introduced next. This acquaints the child with fractional quarters as related to the whole, reinforces the recognition of the primary color red, and introduces the concept of equal heights by comparison with the third column from the left. The column of form blocks on the far right is introduced last. This acquaints the child with the concept of a point, vis-a-vis, a flat surface by comparison with the tops of the blocks in all the other columns, reinforces the child's recognition of the primary color blue, and presents the new conical and pyramidal figures. Any of the form blocks can be used to demonstrate for the child the concept of inside and outside because the form blocks are hollow and open on one side. Special figures, such as arrows, can be formed by combining form blocks or parts of the form blocks. Further, if desired, the numbers two through five can be illustrated to the child by various parts of the form board. There are two parts in each of form blocks 16, 22, and 28; there are three depressions in each column; there are four parts in each of form blocks 17, 23, and 29; and there are five depressions in each row. From the foregoing, it can be seen that the described form board can be used as an effective multipurpose tool for child development. All or some of the form blocks can be placed in the depressions of the base at the same time to enable the child to compare their characteristics and shapes.

Modifications in the make-up of the sets of form blocks are, of course, within the scope of the invention. One such modification that has proved valuable is the following: substitute for form blocks 15, 21, and 27, respectively, duplicates of form blocks 17, 23, and 29, except for a color change to blue; substitute for form blocks 16, 22, and 28, respectively, duplicates of form blocks 17, 23, and 29, except for a color change to blue; and substitute for form blocks 18, 24, and 30, respectively, duplicates of form blocks 17, 23, and 29. Another modification is to make only the first and third of the above three substitutions, leaving three unfractionalized form blocks, three form blocks fractionalized in halves, and nine form blocks fractionalized in quarters.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the form blocks could be solid or could be hollow and enclosed on all sides.

What is claimed is:

1. An article of manufacture for child education, the article comprising:
   a flat base;
   a first plurality of flat identical geometric depressions arranged in the base in a row;
   a second plurality of flat identical geometric depressions arranged in the base in a row adjacent to the first plurality of depressions, the second plurality of depressions having a different geometric shape from the first plurality of depressions;
   a third plurality of flat, identical, geometric depressions arranged in the base in a row adjacent to the first and second plurality of depressions, the third plurality of depressions having a different geometric shape from the first and second plurality of depressions;
   the first, second, and third plurality being equal in number to each other and the individual depressions of the first, second, and third plurality being arranged to form columns that are perpendicular to the rows;
   a first plurality of geometric form blocks equal in number to the first plurality of depressions, the first plurality of form blocks each having a different three dimensional geometric shape with a base shaped to fit interchangeably into each of the first plurality of depressions;
   a second plurality of geometric form blocks equal in number to the second plurality of depressions, the second plurality of form blocks each having a different three dimensional geometric shape with a base shaped to fit interchangeably into each of the second plurality of depressions; and
   a third plurality of geometric form blocks equal in number to the third plurality of depressions, the third plurality of form blocks each having a different three dimensional geometric shape with a base shaped to fit interchangeably into each of the third plurality of depressions.

2. The educational article of claim 1, in which each block of the first plurality of blocks has a characteristic in common with a corresponding block of the second plurality of blocks.

3. The educational article of claim 1, in which each of the blocks is hollow and is open on one side.

4. The article of claim 1, in which each form block of each plurality of form blocks has a characteristic in common with a form block of the other two pluralities of form blocks.

5. The article of claim 4, in which the characteristic is the height of the form blocks.

6. The article of claim 4, in which the characteristic is the color of the form blocks.

7. The article of claim 4, in which the characteristic is the profile of the form blocks.

8. The article of claim 4, in which the characteristic is the fractionalization of the form blocks.

9. The article of claim 8, in which fractionalization of the form blocks is such that each of the form blocks is divided into the same number of parts that are identical to each other.

10. The article of claim 4, in which the first plurality of depressions is circular.

11. The article of claim 10, in which the second plurality of depressions is equilaterally triangular.

12. The article of claim 11, in which the third plurality of depressions is square.

13. The article of claim 12, in which the form blocks are hollow and open on one side.

14. The article of claim 13, in which the common characteristics are height, profile, fractionalization and color; the form blocks of the first plurality comprise a short cylinder, a tall cylinder, a cylinder of medium height fractionalized into equal halves, a cylinder of medium height fractionalized into equal quarters, and a cone; the second plurality of form blocks comprise a short prism, a tall prism, a prism of medium height fractionalized into equal halves, a prism of medium height fractionalized into equal quarters, and a triangular based pyramid; the third plurality of form blocks comprises a short hexahedron, a tall cubicle hexahedron, a hexahedron of medium height fractionalized into equal hexahedral halves, a hexahedron of medium height fractionalized into equal hexahedral quarters, and a square based pyramid; the short form blocks are all the same height and the same primary color; the tall form blocks are all the same height and the same primary color; the form blocks fractionalized into halves are all the same height and the same primary color; the form blocks fractionalized into quarters are all the same height and the same primary color; and the conical, square based pyramidal, and triangular based pyramidal form blocks are all the same primary color.

15. An educational article comprising:
   a base having a flat surface on which are formed a plurality of flat depressions arranged in rows and columns, the plurality of depressions including a first row of identical geometric depressions, a second row of identical geometric depressions having a different geometric shape from the first row of depressions, and a third row of identical geometric depressions having a different geometric shape from the first and second rows of depressions;
   first, second, and third groups of form blocks;
   the form blocks of the first group being equal in number to the depressions in the first row, having geometric shapes with bases that fit interchangeably into the depressions of the first row, and having at least one characteristic that is different from some of the other form blocks of the first group;
   the form blocks of the second group being equal in number to the depressions in the second row, having geometric shapes with bases that fit interchangeably into the depressions of the second row, and having at least one characteristic that is different from some of the other form blocks of the second group;
   the form blocks of the third group being equal in number to the depressions in the third row, having geometric shapes with bases that fit interchangeably into the depressions of the third row, and having at least one characteristic that is different from some of the other form blocks of the third group; and
   each form block in the first group having a corresponding form block in the second group and a corresponding form block in the third group with a common characteristic.

16. The educational article of claim 15, in which the common characteristic is color.

17. The educational article of claim 15, in which the common characteristic is height.

18. The educational article of claim 15, in which the common characteristic is fractionalization.

19. An educational article comprising:

a base having a flat surface on which are formed a plurality of flat depressions arranged in rows and columns, the plurality of depressions including a first row of identical circular depressions, a second row of identical triangular depressions, and a third row of identical square depressions;

first, second, and third groups of form blocks;

the form blocks of the first group being equal in number to the depressions in the first row, having geometric shapes with bases that fit interchangeably into the depressions of the first row, and having at least one characteristic that is different from some of the other form blocks of the first group;

the form blocks of the second group being equal in number to the depressions in the second row, having geometric shapes with bases that fit interchangeably into the depressions of the second row, and having at least one characteristic that is different from some of the other form blocks of the second group;

the form blocks of the third group being equal in number to the depressions in the third row, having geometric shapes with bases that fit interchangeably into the depressions of the third row, and having at least one characteristic that is different from some of the other form blocks of the third group; and each form block in the first group having a corresponding form block in the second group and a corresponding form block in the third group with at least two common characteristics.

20. The educational article of claim 19, in which the common characteristics are color and height.

21. The educational article of claim 19, in which the common characteristics are color, height and fractionalization.

22. The educational article of claim 19, in which the common characteristics are color, height, and fractionalization, two of the form blocks of the first group comprising a short unfractionalized cylinder and a tall cylinder fractionalized into quarters, two of the form blocks of the second group comprise a short unfractionalized prism and a tall prism fractionalized into equilateral quarters, and two of the form blocks of the third group comprise a short unfractionalized hexahedron and a tall hexahedron fractionalized into cubical quarters.

23. The educational device of claim 22, in which one of the form blocks of the first group comprises a tall cylinder fractionalized into halves, one of the form blocks of the second group comprises a tall prism fractionalized into halves, and one of the form blocks of the third group comprises a tall hexahedron fractionalized into halves.

* * * * *